(No Model.) 3 Sheets—Sheet 1.

N. H. EDGERTON.
ELECTRIC MOTOR.

No. 354,111. Patented Dec. 14, 1886.

WITNESSES:
T. F. Holden.
Geo. R. Byington.

INVENTOR,
N. H. Edgerton
By S. J. Van Stavoren
ATTORNEY (No Model.) 3 Sheets—Sheet 2.

N. H. EDGERTON.
ELECTRIC MOTOR.

No. 354,111. Patented Dec. 14, 1886.

WITNESSES:
J. F. Holden
Geo. Byington

INVENTOR.
N. H. Edgerton
By S. J. Van Stavoren
ATTORNEY (No Model.) 3 Sheets—Sheet 3.
N. H. EDGERTON.
ELECTRIC MOTOR.
No. 354,111. Patented Dec. 14, 1886.
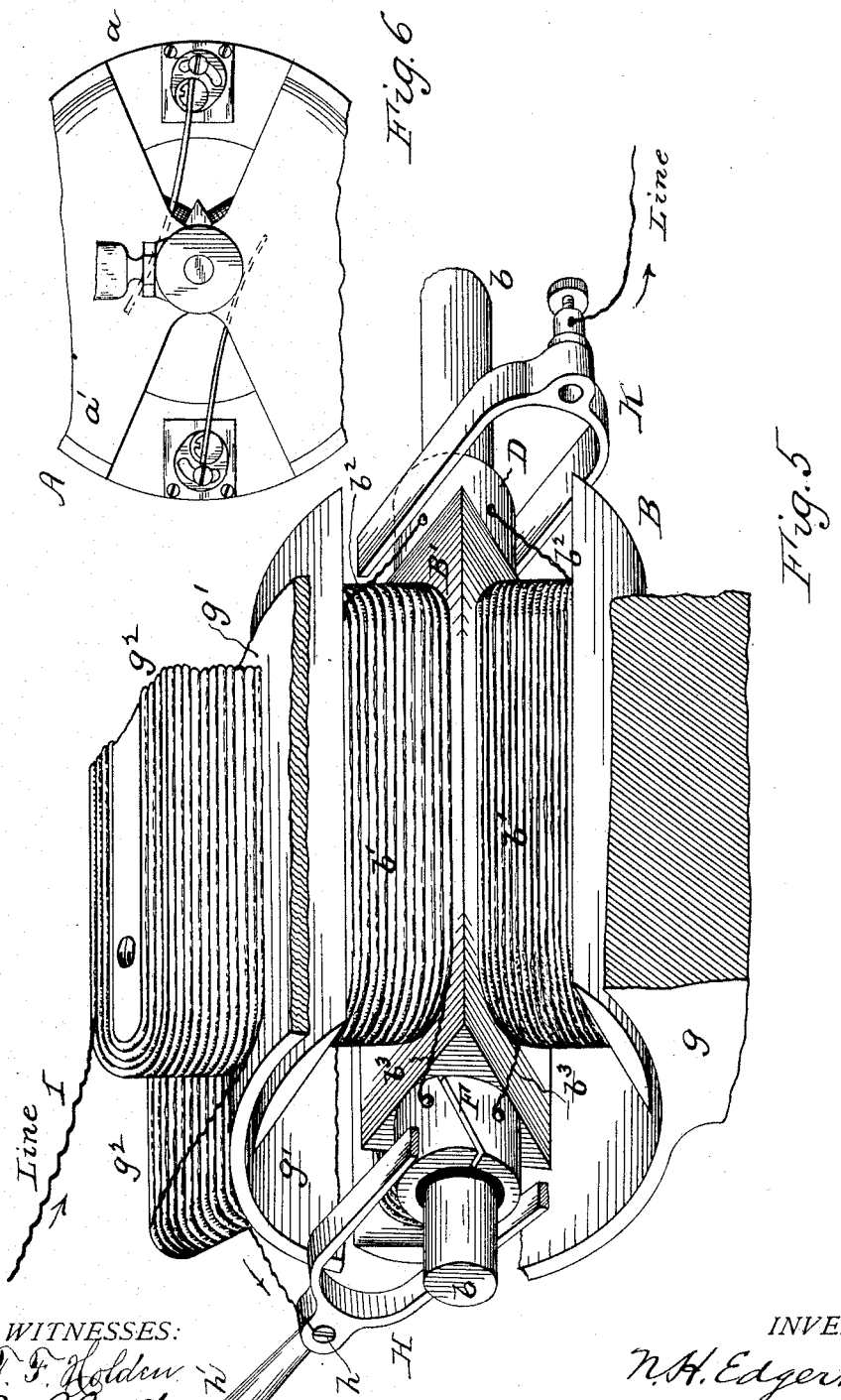
WITNESSES:
INVENTOR,
N. H. Edgerton
By S. J. Van Stavoren
ATTORNEY

UNITED STATES PATENT OFFICE.

NATHAN H. EDGERTON, OF PHILADELPHIA, PENNSYLVANIA, ASSIGNOR, BY MESNE ASSIGNMENTS, TO THE EDGERTON ELECTRIC MOTOR COMPANY OF NEW JERSEY.

ELECTRIC MOTOR.

SPECIFICATION forming part of Letters Patent No. 354,111, dated December 14, 1886.

Application filed October 29, 1885. Serial No. 181,243. (No model.)

*To all whom it may concern:*

Be it known that I, NATHAN H. EDGERTON, a citizen of the United States, residing at Philadelphia, in the county of Philadelphia and State of Pennsylvania, have invented certain new and useful Improvements in Electric Motors, of which the following is a specification, reference being had therein to the accompanying drawings, wherein—

Figure 1:
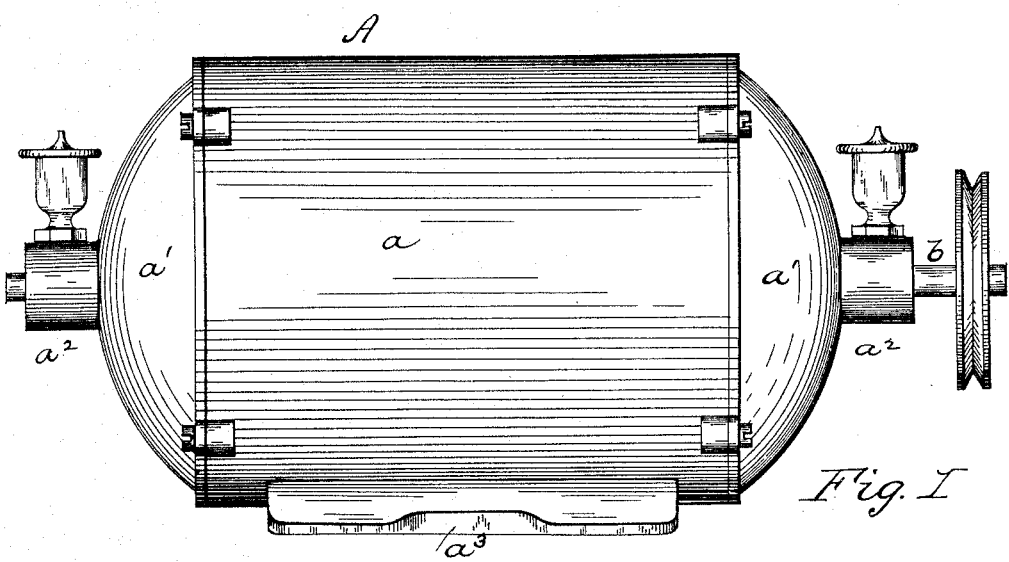
Figure 2:
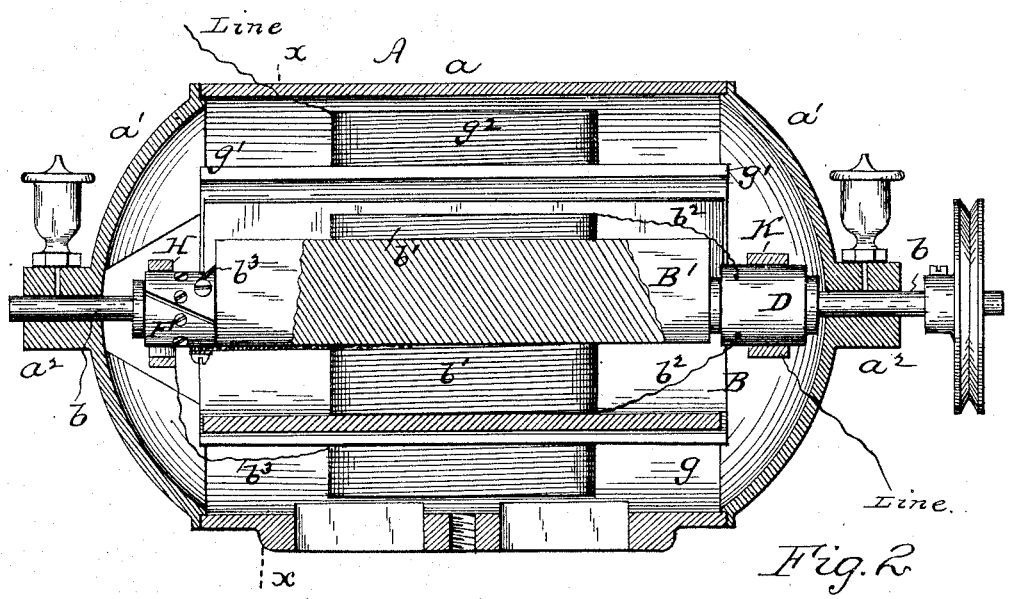
Figure 3:
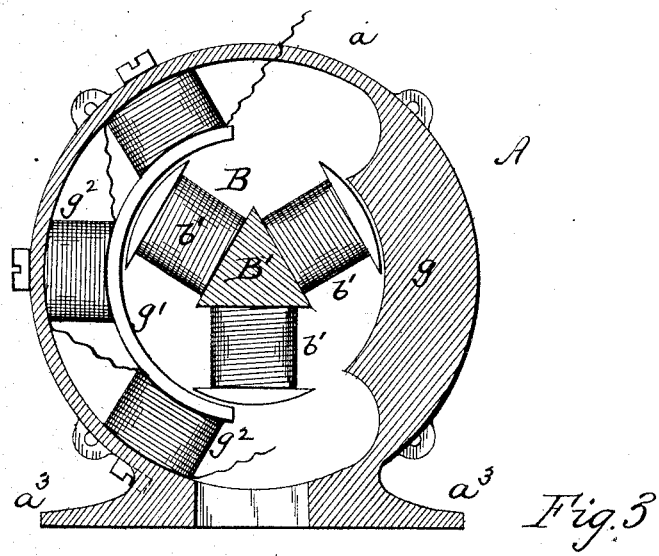
Figure 4:
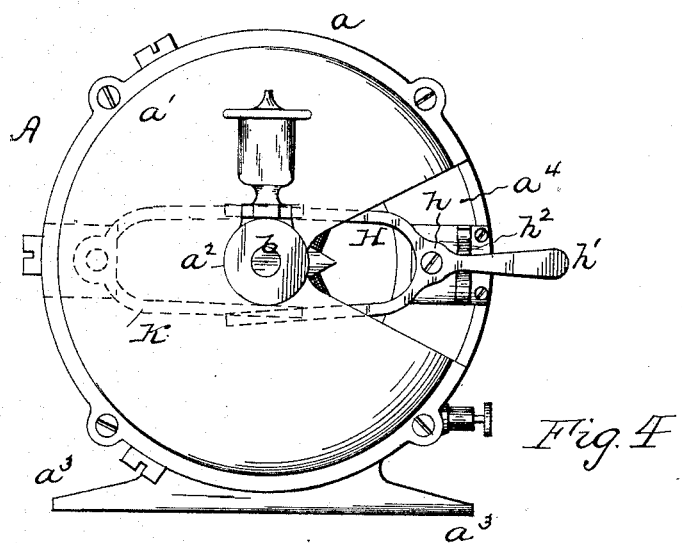

Figure 1 is a side elevation of the motor. Fig. 2 is a central longitudinal vertical section. Fig. 3 is a transverse section on line $x$ $x$, Fig. 2. Fig. 4 is an end view at the brush end of the machine. Fig. 5 is a perspective of armature, brushes, and part of the field-magnet, showing more plainly the circuit-connection between said parts; and Fig. 6 is an elevation of an end of the motor, partly broken away, showing the usual form of brushes in connection with my improvements.

My invention has relation to electromotors; and it has for its object simplicity of construction, whereby sparking on the commutator and heating of the armature are decreased and the durability and efficiency of the machine is increased.

My invention accordingly consists of the combination, construction, and arrangement of parts as hereinafter described and claimed, having reference particularly to a motor having a field-magnet composed of two pole-pieces and a set of one or more helices or coils for one of said poles only, to a motor-casing having one of the poles of the field-magnets formed thereon or attached thereto, which pole is devoid of coils or helices, the remaining pole with coils or helices being secured to said casing, to preferably a prismatic form of armature having coils or helices one set of the ends of which are in multiple arc or electrically connected with an insulated ring at one end of the armature, and the other set of the ends of said coils or helices are attached to separate commutator blocks or segments, to an armature having an insulated ring at one end in multiple-arc circuit with the armature coils or helices, and having a forked contact or brush for placing the ring in the circuit of the machine, and, finally, to a single-forked brush for the commutator, arranged to oscillate to contact on either side of the commutator for reversing the direction of the flow of current through the machine to change the direction of rotation of the armature.

In the drawings, A represents the motor-casing, composed of a main cylindrical or tubular body, $a$, and approximately semispherical or other suitably configured heads, $a'$, having bearings $a^2$ for the shaft $b$ of the armature B. The body $a$ and its heads are flanged, bolted, or they may otherwise be secured together, as desired. Any suitable form of feet-flanges $a^3$ may be cast on body $a$. Upon its inner wall, or in its bore on one side thereof, is also cast or attached thereto a pole-piece, $g$, as shown more plainly in Fig. 3. This pole-piece is unwound or not provided with coils or helices. The opposite pole-piece, $g'$, and its coils or helices $g^2$ are secured to the body $a$ in any suitable way. This described construction of the pole-pieces $g$ $g'$ makes the casing-body $a$ a yoke for the poles of the field-magnet as the coils or helices $g^2$ are wound around only one pole, $g'$, of the field-magnet.

Any suitable number of coils or helices $g^2$ may be wound for the pole-piece $g$, and both poles may be vertically arranged, as shown, or otherwise, as desired.

The armature B is prismatic in form, as indicated, as I prefer to so make the same; but it may be variously configured according to the number of coils or helices $b'$ placed or wound thereon. In the drawings three helices or coils, $b'$, are shown projecting from the three sides of the armature core or body B', which is prismatic in form, as desired.

At one end of the latter, and upon the shaft $b$, is placed an insulated ring or sleeve, D, to which one end, $b^2$, of all the armature-helices $b'$ connect to place these helices in multiple arc with said sleeve. The remaining ends $b^3$ of the helices $b'$ connect with separate segments of the commutator F in the usual or any other suitable manner.

Various arrangement of circuit-connections may be employed for placing the armature and field-magnets in a line-circuit for operating the motor, and any suitable form of double brushes may be used for the commutator, a form of which is shown in Fig. 6; but I prefer to employ a forked brush, H, pivoted at $h$ to casing-body $a$, passing through a recess, $a^4$, in one of the heads of said body, and having a handle, $h'$, for oscillating it on its pivot-point.

The fork of the brush is of such width that only one of its sides or ends contact with the commutator at a time, so that by oscillating the brush from side to side to make one of its ends contact with either side of the commutator the direction of the current to and through the armature is changed and a reversal in the direction of the rotation of the armature-shaft is effected.

Upon sleeve D is placed a forked brush or contact, K, both ends of which are always in contact with the sleeve when it is in the line-circuit of the machine. This circuit, as shown, is by way of wire I to field-magnet helices $g^2$ and brush H, thence through commutator F and armature-helices $b'$ to sleeve D, and thence by way of brush K to line. (See more plainly Fig. 5.) The use of only one set of field-magnet helices and one brush at the commutator I find in practice materially reduces heating in the armature and diminishes sparking on the commutator, and the practical efficiency of the machine is appreciably increased.

To maintain the forked brush H in position when moved or adjusted, a spring, $h^2$, of a bow or other suitable shape is inserted between it and casing-body $a$; or other suitable fastening devices may be employed.

It will be noted from the foregoing that I am able to reverse direction by the use of but one double or forked brush one end or arm of which is in contact with the commutator at a time, that the pole-pieces and helices of the field are within the casing, that the pole-piece having helices is detachable from the casing for easy access thereto for repairing or other purposes, that the casing forms an unbroken or unjointed connecting-yoke for the pole-pieces and presents a large radiating-surface for getting rid of the heat generated in the coils of the motor, that each armature spool or coil is complete in itself and is confined to the influence of one field-magnet pole-piece at a time, that all the ends of the armature-coils connected to the insulated ring are of one polarity, and all those connected to the commutator are also of one polarity, and that the armature therefore admits of any desired number of spools or coils having the same connections being attached thereto within its limit or capacity.

What I claim is—

1. In an electric motor, an elongated casing having in its bore and on one side a pole-piece without helices, and on the opposite side another pole-piece provided with a helix or helices, and the casing serving as an unbroken or unjointed connecting-yoke for the said pole-pieces, substantially as shown and described.

2. In an electric motor, a tubular casing having in its bore on one side a projection forming a pole-piece without helices and integral with the casing, and on the opposite side another pole-piece detachable from the casing and provided with a helix or helices, and the casing serving as an unbroken or unjointed connecting-yoke for the pole-pieces, substantially as shown and described.

3. An electric-motor casing composed of a tubular body having outside feet or supports, oppositely-located pole-pieces in its bore, and detachable end caps or plates having bearings for the armature-shaft, substantially as shown and described.

4. A motor having a field-magnet one pole of which is without helices, an armature having spools or helices each complete in itself, an insulated ring on the armature-shaft in multiple-arc circuit with one set of the ends of the armature-coils, and a commutator for the remaining set of ends of the armature-coils, substantially as shown and described.

5. In an electric motor, the combination of an armature having an insulated ring in multiple-arc circuit with one set of ends of the armature coils or helices and a commutator having a single forked or one double-ended brush, substantially as shown and described.

6. In an electric-motor, the combination of a field-magnet having two oppositely-placed pole-pieces, a series of helices on one of the pole-pieces, an armature having a forked commutator-brush, and an insulated ring in multiple-arc circuit with the armature coils and a brush in series with the line, substantially as shown and described.

In testimony whereof I affix my signature in presence of two witnesses.

NATHAN H. EDGERTON.

Witnesses:
S. J. VAN STAVOREN,
CHAS. F. VAN HORN.